United States Patent
Mineo

[11] Patent Number: 5,536,189
[45] Date of Patent: Jul. 16, 1996

[54] EXHAUST SYSTEM FOR WATERCRAFT

[75] Inventor: Shigeharu Mineo, Hamamatsu, Japan

[73] Assignee: Sanshin Kogyo Kabushiki Kaisha, Hamamatsu, Japan

[21] Appl. No.: 341,755

[22] Filed: Nov. 18, 1994

[30] Foreign Application Priority Data

Nov. 23, 1993 [JP] Japan .................................. 5-315822
Nov. 23, 1993 [JP] Japan .................................. 5-315823

[51] Int. Cl.⁶ .................................................. B63H 21/32
[52] U.S. Cl. ........................................... 440/89; 114/270
[58] Field of Search ................................. 440/2, 38, 88, 440/89, 113; 114/270

[56] References Cited

U.S. PATENT DOCUMENTS

| 4,625,669 | 12/1986 | Nishida | 114/270 |
| 5,007,870 | 4/1991 | Okuba et al. | 440/89 |
| 5,016,439 | 5/1991 | Nitta | 440/89 |
| 5,096,446 | 3/1992 | Tazaki et al. | 440/89 |
| 5,197,909 | 3/1993 | Rossitto | 440/2 |

FOREIGN PATENT DOCUMENTS 0003598 1/1990 Japan .

Primary Examiner—Edwin L. Swinehart
Attorney, Agent, or Firm—Knobbe, Martens, Olson & Bear

[57] ABSTRACT

A small personal watercraft having an exhaust system that is designed to provide adequate length and which has a downwardly inclined section that is disposed above the exhaust manifold for ensuring that water cannot enter the engine through the exhaust system. The engine is water cooled and the coolant that is circulated through the engine cooling jacket is discharged back to the body of water in which the watercraft is operating through the exhaust system. A direct coolant discharge having a relatively large effective area for limiting the amount of water entering the exhaust system. A tell-tale discharge is disposed in a lower portion of the hull to be visible by a rider but will not enter the passenger's area and will drain from the tell-tale when the engine is not running.

27 Claims, 6 Drawing Sheets

EXHAUST SYSTEM FOR WATERCRAFT

BACKGROUND OF THE INVENTION

This invention relates to an improved exhaust system for watercraft and more particularly to an improved exhaust system for a personal watercraft incorporating a water-cooled engine.

There is a particularly popular type of small watercraft which is characterized as a "personal watercraft." This type of watercraft is a type in which one or more passengers ride on rather than in the watercraft. Frequently, these watercraft are sporting in nature, and the occupants or riders expect to leave the watercraft at times during its use and enter into the body of water in which the watercraft is operating. Generally, this type of watercraft is also powered by a jet propulsion unit which is positioned in a tunnel formed on the underside of the hull. It should be obvious that this type of watercraft is quite compact in its nature.

Because of the small size of this type of watercraft, it presents particular problems in connection with the exhaust treatment. That is, it is obviously necessary to discharge the exhaust gases from the powering internal combustion engine to the atmosphere. The discharge of the exhaust gases should be such, however, so that there is adequate cooling and silencing of the exhaust gases. In addition, the exhaust gases should be discharged in such a way as to not soil the hull of the watercraft, nor should the exhaust gases be discharged into proximity to the riders of the watercraft. Finally, the exhaust system should be designed so as to provide good tuning for the performance of the engine. All of these factors are difficult to accommodate in such small personal watercraft.

It is, therefore, a principal object of this invention to provide an improved exhaust system for a small personal watercraft.

It is a further object of this invention to provide an exhaust system for a personal watercraft that will provide sufficient length of exhaust gas flow so that the exhaust gases may be discharged to the atmosphere away from the occupants of the watercraft and also to provide adequate length for engine tuning purposes.

The engines employed for powering personal watercraft normally are liquid cooled. Coolant for the engine is drawn from the body of water in which the watercraft is operating and is discharged back into the body of water after being circulated through the engine. Frequently it is the practice to provide a cooling jacket around a portion of the exhaust system through which the engine coolant also passes. This cooling of the exhaust gases improves silencing and also provides protection for the hull from the heat of the exhaust system. One way in which the water from the cooling jacket is returned to the body of water in which the watercraft is operating is to mix it with the exhaust gases in the exhaust system and discharge the water along with the exhaust gases.

Although this type of coolant discharge further aids in exhaust silencing and water discharge, it raises the possibility that water may enter the engine through the exhaust system. This is obviously an undesirable result.

It is, therefore, a still further object of this invention to provide an improved exhaust system for a personal watercraft wherein at least a portion of the engine coolant is discharged along with the exhaust gases but wherein the exhaust system is constructed and configured so that water is not likely to flow to the engine through the exhaust system.

If all of the engine coolant is discharged back to the body of water in which the watercraft is operating through the exhaust system, then when running at high speeds and high loads, there may be excess back pressure in the exhaust system. The reason for this is that the amount of water circulated for cooling purposes increases generally with engine speed and frequently in a nonproportional manner. As a result, both the water flow and exhaust flow can increase as engine speed and load increases, and this can give rise to problems with excess back pressure.

It is, therefore, a still further object of this invention to provide an improved exhaust system for a small watercraft and water discharge system that incorporates at least in part the exhaust system.

These small personal watercraft generally are relatively simple in instrumentation and normally do not employ any coolant temperature sensor. As a result, it is difficult at times for the operator to assure that coolant is flowing through the cooling jacket of the engine. There have been proposed systems wherein a tell-tale is provided to enable the operator to ascertain that coolant is being circulated through the engine cooling jacket. These tell-tales discharge a portion of the coolant at a location where the operator can see it and confirm that water is flowing through the engine cooling jacket. However, the previously proposed tell-tales with this type of watercraft have certain disadvantages. Generally these tell-tales extend from the engine cooling system to a point on the upper side of the deck so as to be visible by the operator. However, this upwardly extending tell-tale conduit can cause water to remain in the conduit when the engine is not running. This can cause corrison and obstruction of the conduit, particularly when operating in a marine environment. Also, this upwardly location of the tell-tale outlet may cause some of the water to flow into the rider's area and collect on the floor there.

It is, therefore, a still further object of this invention to provide an improved tell-tale arrangement for a personal watercraft having a water-cooled engine.

SUMMARY OF THE INVENTION

A first feature of this invention is adapted to be embodied in a watercraft that is comprised of a hull having a passenger's area formed by the hull in a deck portion thereof. A longitudinally extending raised seat portion in the passenger's area accommodates a rider seated in straddle fashion. An engine compartment is formed in the hull and contains an engine for driving a propulsion unit for powering the watercraft. The engine is provided with an exhaust manifold for receiving exhaust gases from the engine and which has a forwardly disposed outlet. An exhaust pipe extends from the outlet upwardly and then rearwardly and downwardly substantially beneath the seat portion to an exhaust gas outlet to the rear of the passenger's area for discharge of the exhaust gases to the atmosphere.

Another feature of the invention is adapted to be embodied in a watercraft having a hull that defines an engine compartment in which a liquid-cooled internal combustion engine is contained. Coolant is circulated from the body of water in which the watercraft is operated through an engine cooling jacket. The engine has an exhaust system for discharging exhaust gases from the engine to the atmosphere. A portion of the coolant circulated through the engine cooling jacket is discharged back to the body of water in which the watercraft is operating through the exhaust system. Further portions of the coolant are delivered back to the body of water in which the watercraft is operating from an area disposed above the exhaust system and directly to the body of water in which the watercraft is operating independently of the passages of the exhaust system.

A still further feature of the invention is adapted to be embodied in a watercraft comprised of a hull defining a passenger's area. An internal combustion engine is provided within an engine compartment of the hull and has a liquid cooling jacket through which water from the body of water in which the watercraft is operating is circulated. At least a portion of the circulated water is discharged through a side of the hull at a point above the water line, but at a low location so that it will not enter the passenger's area and to preclude against water collection in the tell-tale when the engine is not running to enable the rider to ascertain that coolant is circulating through the engine.

DETAILED DESCRIPTION OF THE PREFERRED EMBODIMENT OF THE INVENTION

Figure 1:
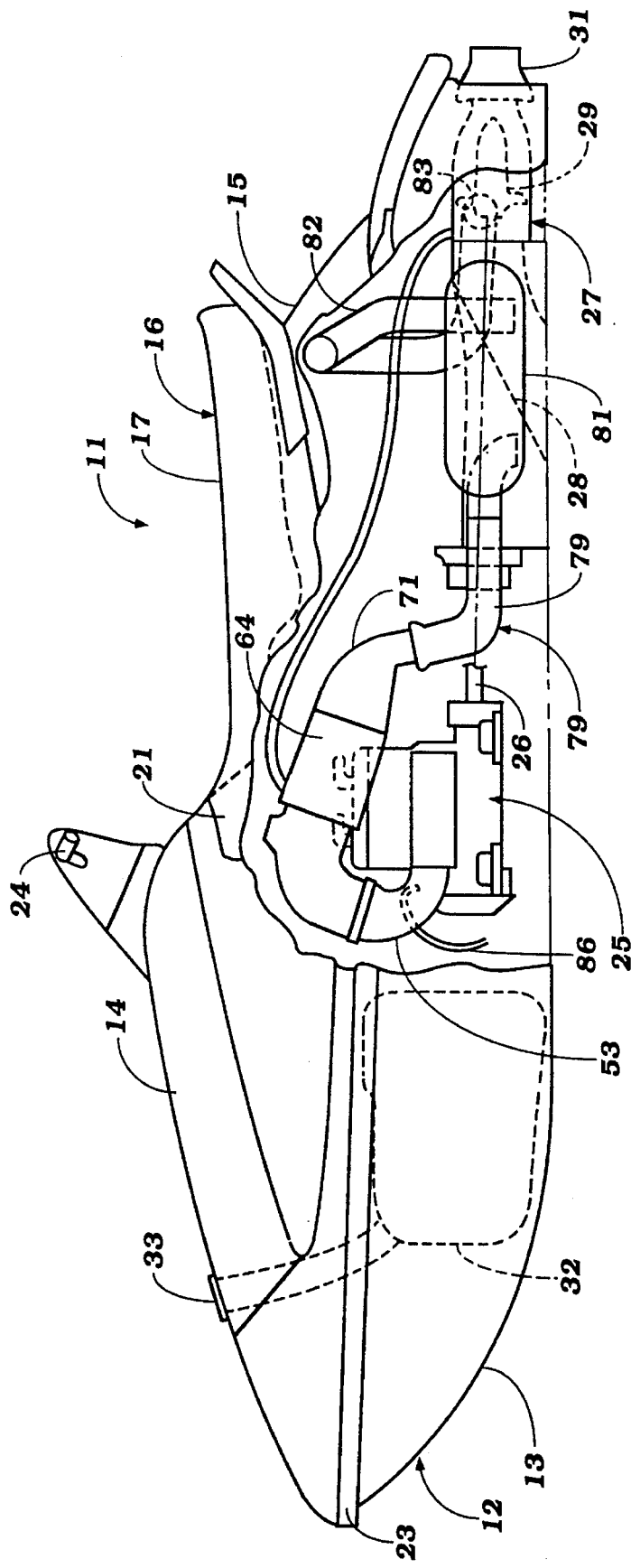
FIG. 1 is a side elevational view of a personal watercraft constructed in accordance with an embodiment of the invention, with a portion broken away so as to more clearly show portions of the construction.

Referring now in detail to the drawings and initially primarily to FIG. 1, a small personal watercraft constructed in accordance with an embodiment of the invention is identified generally by the reference numeral 11. The particular configuration of the watercraft 11 that is depicted in the drawings may be considered to be typical of those types of watercraft with which the invention may be employed. It will be readily apparent, however, to those skilled in the art that the invention may be utilized with a wide variety of types of watercraft differing from that of the configuration depicted. In addition, although the invention is particularly adapted for use with personal watercraft, it will also become apparent to those skilled in the art that the invention, or at least certain facets of it, may be utilized with a wide variety of types of watercraft other than personal watercraft.

The watercraft 11 is comprised of a hull assembly, indicated generally by the reference numeral 12, which is made up of a lower hull part 13 and an upper deck part 14. The material from which the hull 12 is formed may be of any type of material normally employed in this type of watercraft; for example, a fiberglass reinforced resin or the like.

To the rear of the hull 12 there is provided a passenger's area which is defined in part by a raised hull portion 15 (FIG. 4) upon which a seat, indicated generally by the reference numeral 16, is provided. The seat 16 has a generally longitudinally extending portion 17 which is cushioned and which is designed so as to accommodate one or more riders seated in straddle fashion. Where more than one rider is accommodated, they are seated in tandem fashion.

A pair of foot areas 18 are formed on opposite sides of the raised deck portion 15 and provide floor areas 19 upon which the seated riders may place their feet. The forward portion of the seat 16 is padded as at 21 so that the rider may grip the seat between his knees for stability purposes.

It should be noted that the area outside of the floor areas 19 is encompassed by a raised area 22 that is defined in part by a gunnel 23 that extends generally around the perimeter of the hull 12 and which may be formed at the area where the hull portion 13 and deck portion 14 are connected to each other.

As is also typical with this type of watercraft, the foot areas 18 extend generally rearwardly through an open area at the transom of the watercraft so that the watercraft may easily be boarded at the rear from the body of water in which the watercraft is operated.

The watercraft 11, and particularly its propulsion unit, is controlled by means of a handlebar assembly 24 that is positioned immediately forwardly of the seat 16. This handlebar assembly includes an arrangement for steering of the watercraft 11, as will be described, a throttle control, and other controls, as are well known in the art.

The area beneath the forward portion of the deck 14 and extending at least in substantial part below the forward portion of the seat 16 forms an engine compartment in which an internal combustion engine, indicated generally by the reference numeral 25, is provided for powering of the watercraft. The engine 25 is, in the illustrated embodiment, depicted as being a two-cylinder, in-line, crankcase compression, two-cycle internal combustion engine. It will be readily apparent to those skilled in the art, however, how the watercraft 11 may be propelled by a wide variety of types and configurations of engines.

Continuing to refer to FIG. 1, the engine 25 has its output shaft connected to a drive shaft 26 that extends rearwardly and which drives a jet propulsion unit, indicated generally by the reference numeral 27, which is positioned to the rear of the hull 12 for propelling the watercraft 11. The jet propulsion unit 27 may be disposed in substantial part within a tunnel formed at the rear of the hull portion 13.

The jet propulsion unit is of any known type and is depicted as having a downwardly facing water inlet portion 28 that opens through a corresponding opening in the underside of the hull 13. Water is drawn through this water inlet portion 28 by means of an impeller 29 that is fixed to an impeller shaft which is, in turn, drivingly coupled to the drive shaft 26. This water is then discharged rearwardly back to the body of water in which the watercraft is operating through a steering nozzle 31 which is coupled to the handlebar assembly 24 for steering of the watercraft in a manner well known in this art.

The area of the engine compartment forward of the engine 25 may include a fuel tank 32 which has a fill neck 33 disposed at one side or centrally in the forward portion of the deck 14. The fuel tank 32 supplies fuel to the engine 25 in a manner well known in this art.

The construction of the watercraft 11 as thus far described may be considered to be conventional, and for that reason, any components which have not been described may be considered to be conventional, and further description of these conventional components is not believed to be necessary to understand the construction and operation of the invention.

Figure 2:
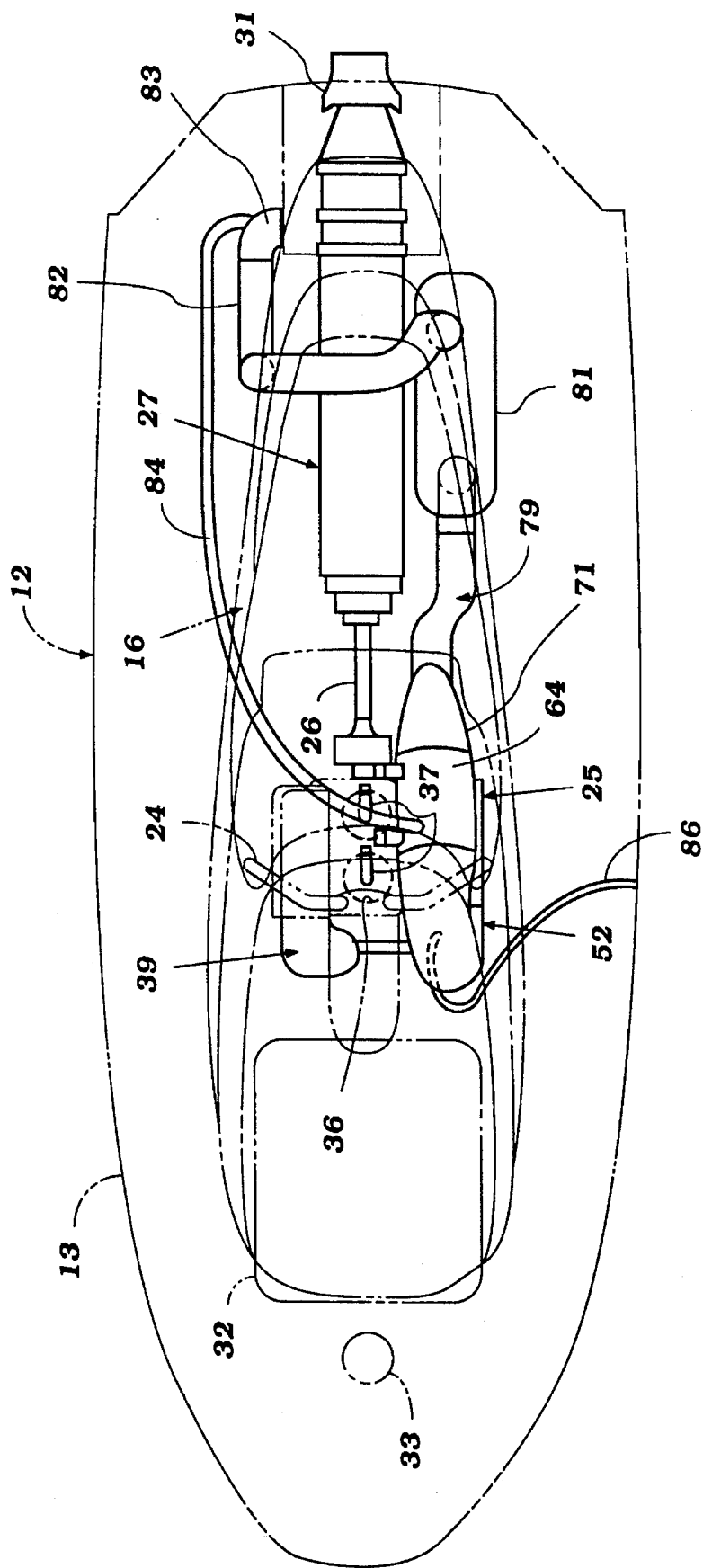
FIG. 2 is a top plan view of the watercraft with all components except for the engine, propulsion unit, and engine exhaust system shown in phantom.

Although the construction of the engine 25 may be considered to be conventional, certain components of the engine 25 will be described inasmuch as the layout of certain of the components and auxiliaries for the engine 25 and their construction is important in the invention. The engine 25 is comprised of a crankcase assembly 34 (FIGS. 3 and 4) in which the engine output shaft (a crankshaft) that is coupled to the drive shaft 26 is rotatably journaled. A cylinder block 35 extends vertically upwardly from the crankcase 34 and contains the cylinders of the engine. As has been noted, in the illustrated embodiment the engine 25 is of the two-cylinder in-line type and its cylinder bores are shown in phantom in FIG. 2 and are identified by the reference numerals 36. A cylinder head 37 is affixed to the upper end of the cylinder block 35 and closes these cylinder bores. The engine spark plugs 38 are mounted in the cylinder head 37 in a well-known manner and are fired by a suitable ignition system.

As is well known in two-cycle crankcase engine practice, the crankcase chambers formed by the crankcase assembly 34 of the engine are sealed from each other. An intake charge is delivered to these crankcase chambers for compression and transfer to the cylinder bores 36. An induction system, indicated generally by the reference numeral 39, is provided on one side of the engine for this charge introduction and charge forming. This induction system 39 includes an atmospheric air inlet 41 which draws atmospheric air from within the engine compartment and which is curved to face downwardly so as to ensure against the ingestion of water into the induction system. The air inlet 41 communicates with a plenum chamber 42 which, in turn, delivers the air to a pair of down-draft carburetors 43. These carburetors 43 receive fuel from the fuel tank 32 previously referred to in any well-known manner.

The charge thus formed is then transferred to an intake manifold 44 which is affixed to a side of the crankcase assembly 34 and which transfers the charge to the crankcase chambers through read-type check valves. It should be noted that the carburetors 43 and plenum chamber 42, as well as the inlet to the intake manifold 44, have their centers lying on a longitudinally extending plane $C_1$ which is disposed at an acute angle to the vertical. This permits the induction system 39 to curve over the top of the engine 35 and maintain a relatively narrow seat 16 above the raised deck area 15 to afford comfortable seating while still permitting adequate space for the components.

The charge which has been delivered to the crankcase chambers of the engine through the induction system 39 is further compressed in the crankcase chambers and then is transferred to the area above the pistons in the cylinder bores 36 through a known type of scavenging system. The charge then is fired by the spark plugs 37 and causes the combustion to occur, which powers the engine 25.

Figure 5:
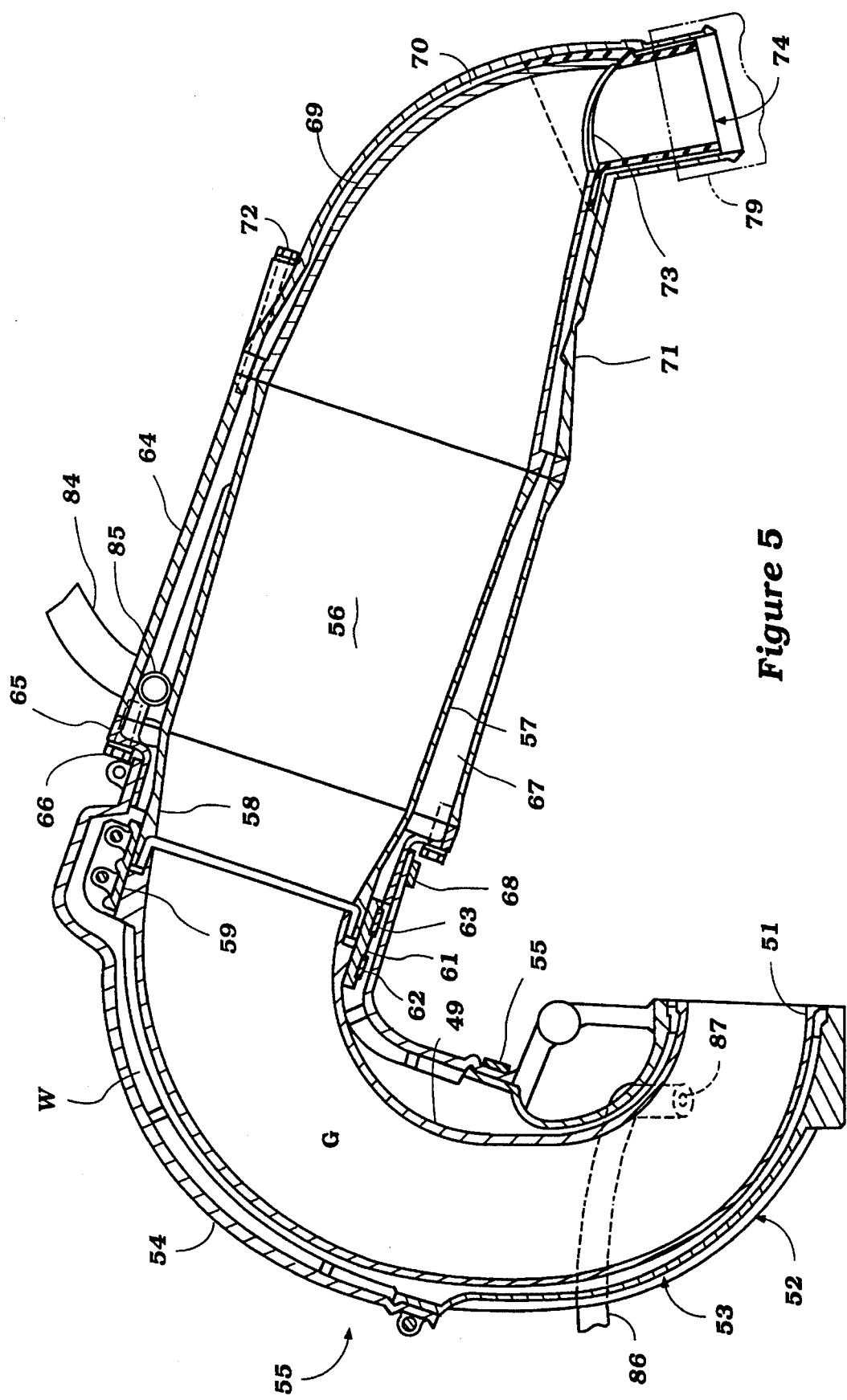
FIG. 5 is an enlarged cross-sectional view taken along a plane extending parallel to the plane of FIG. 5 and shows a portion of the engine exhaust system.

The exhaust gases are discharged through a pair of exhaust ports 45 (FIG. 3) formed in the side of the cylinder block 35 to an exhaust manifold, indicated generally by the reference numeral 46. This exhaust manifold 46 is provided with a pair of runners 47 that deliver the exhaust gases to a common manifold section 48. This manifold section 48 terminates in a forwardly facing exhaust discharge opening. This opening communicates with an exhaust pipe that includes a generally C-shaped pipe assembly that is comprised of a unitary inner pipe 49 (FIGS. 3 and 5) that has an inlet opening 51 that communicates directly with the outlet opening of the exhaust manifold 46 and which is generally aligned with the manifold section 48. This inner pipe 49 defines a gas flow path indicated at G.

The inner pipe 49 is surrounded by an outer pipe section, indicated generally by the reference numeral 52, which is comprised of a first lower part 53 and a second upper part 54. The parts 53 and 54 may be formed from a suitable flexible material and are held together by means of a pipe clamp 55. The inner diameter of the outer pipes 53 and 58 is greater than the outer diameter of the inner pipe 49 so as to define a water cooling jacket therebetween which is filled with coolant, as indicated at W, which is delivered to them from the cooling jacket of the engine 25.

Figure 3:
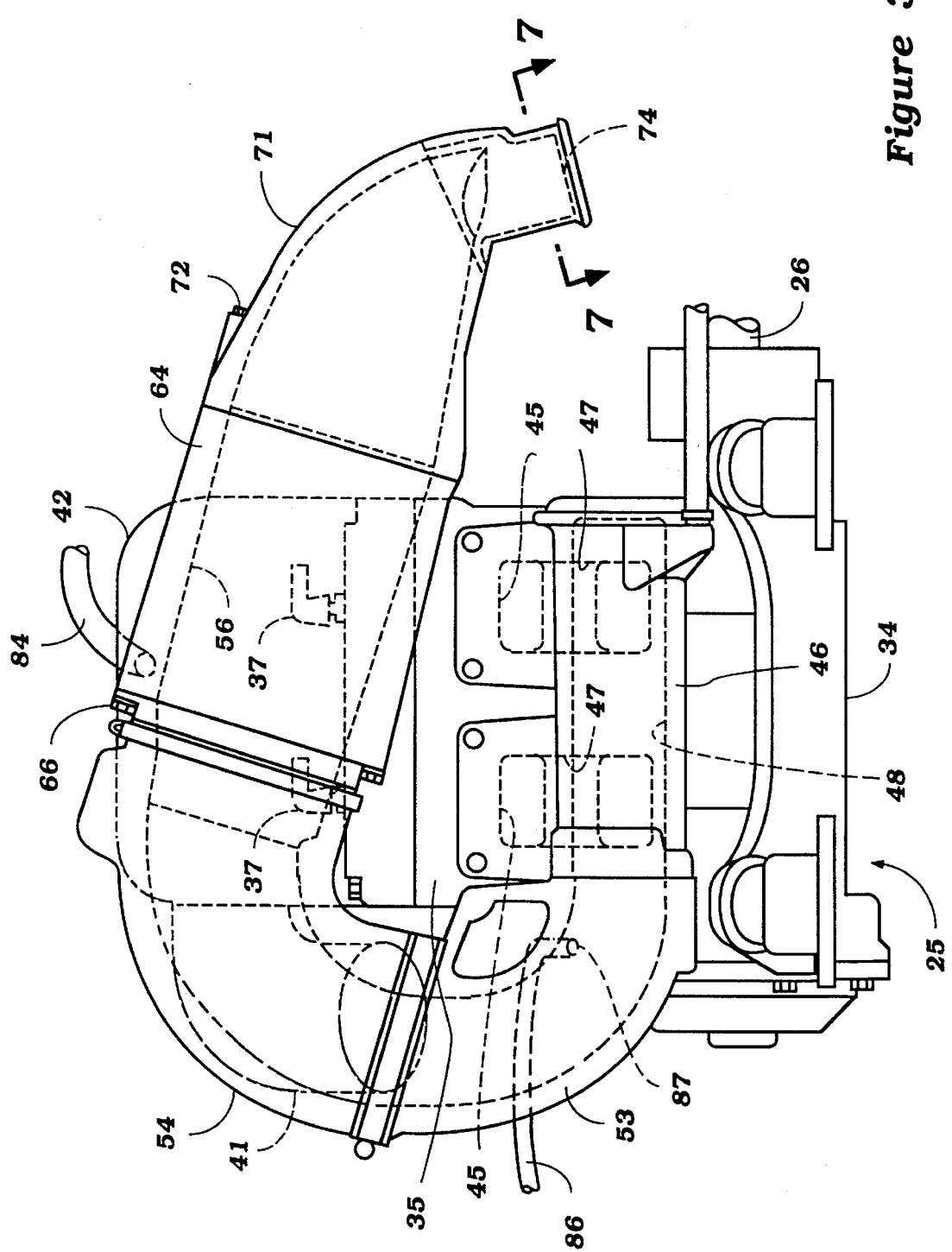
FIG. 3 is an enlarged side elevational view of the engine and a portion of the exhaust system.

In this regard and as is typical in this art, the engine 25 is provided with a water-cooling system. The cooling system includes a pump for pumping water from the body of water in which the watercraft is operating. The jet propulsion unit 27 and specifically its impeller 29 may act as such a pump by drawing off a portion of the water pumped by it as is common in this art. The water thus pumped is delivered to the cooling jacket of the engine 25 through a delivery pipe 50 (FIG. 3). This water is then discharged in a suitable manner to the water jacket W. All of the water which flows through the cooling jackets of the engine is discharged into this exhaust system cooling jacket.

Figure 4:
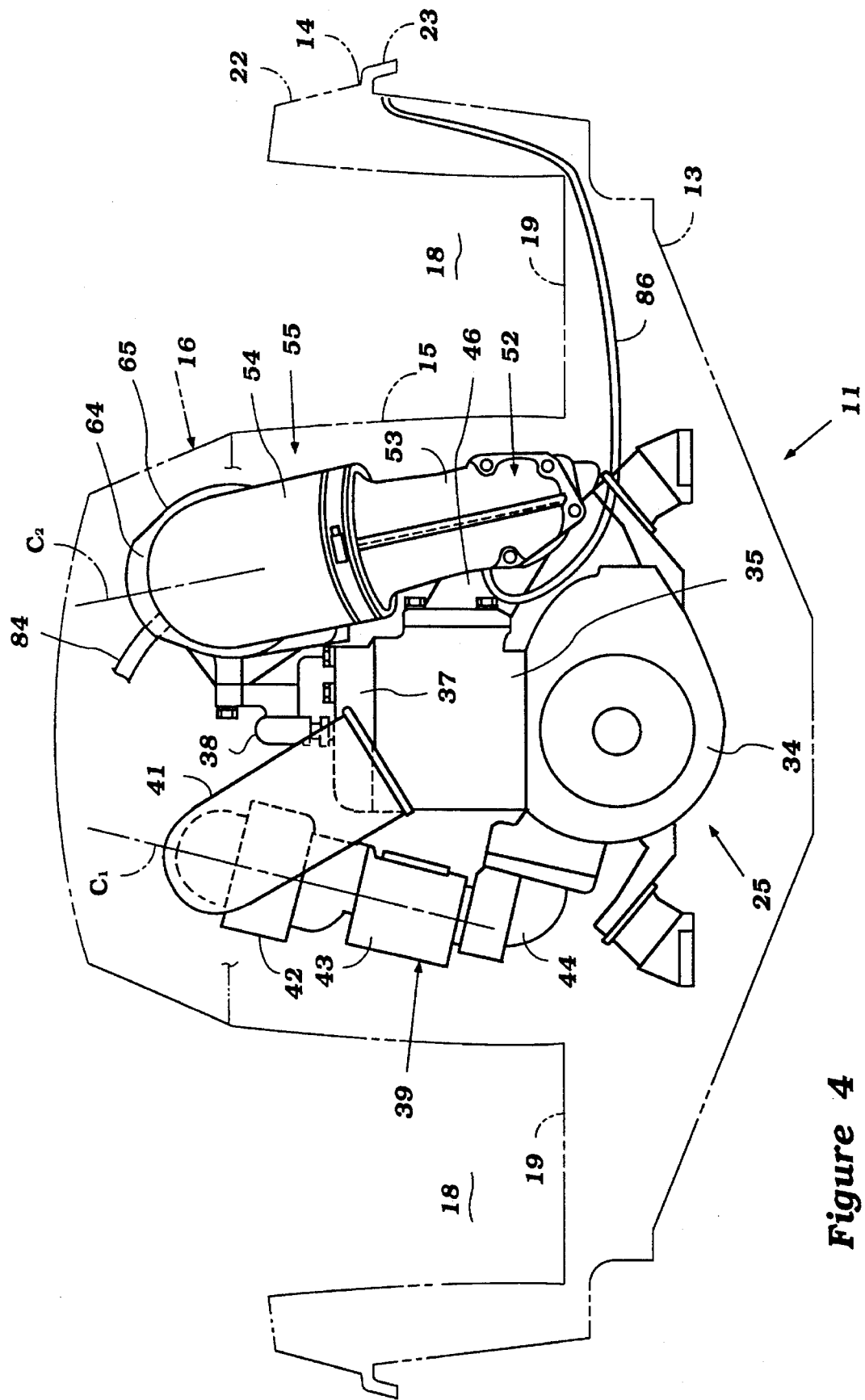
FIG. 4 is a front elevational view of the engine in the watercraft, with the watercraft being shown in phantom so as to more clearly show the positioning of the various components of the engine and the auxiliaries thereof.

The portions of the exhaust system downstream of the manifold 46 may be referred to collectively as an exhaust pipe, and this system is indicated generally by the reference numeral 55. The C-shaped pipe section that includes the inner pipe 49 extends generally upwardly and curves rearwardly. At the same time, this section, as thus far described, has its centerline $C_2$ (FIG. 4) also inclined at an acute angle to a vertical plane and leaning inwardly toward the intake system, as shown in FIG. 4, to further promote the compact nature of the configuration and still provide adequate length and volume without encroaching in the passenger's area.

This inner pipe 49 communicates with an expansion chamber, indicated generally by the reference numeral 56 (FIG. 5), which lies along one side of the engine 25 and generally vertically above it. This expansion chamber 56 is formed by an inner pipe 57 which has a flange 58 at its forward end that is connected to a discharge flange 59 of the inner pipe 49 by means of an elastic sleeve 61 and a pair of hose-type clamps 62 and 63. This connection permits expansion and contraction due to thermal loads without adversely affecting the sealing of the exhaust gas flow.

An outer housing of the expansion chamber 56 is comprised of an outer tube 64 to which a forward endclosure 65 is affixed by threaded fasteners 66. Again, a water cooling jacket, indicated generally by the reference numeral 67, is provided between the inner pipe 57 and the outer tube 64. The endclosure 65 is affixed in sealing relationship to the rear portion of the outer tube 54 of the front C-shaped tube 52 by means of a hose clamp 68 or the like. As a result, cooling water jacket integrity is also ensured with this construction.

The expansion chamber 56 has a slightly larger effective area than the C-shaped inner pipe 49 so as to achieve some silencing function. The expansion chamber 56 is formed with a further downstream pipe section 69 that is affixed to the inner pipe 57 in a suitable manner and which is also encircled by an outer pipe 71 or endclosure that is affixed to the outer tubular member 64 of the expansion chamber by threaded fasteners 72.

The inner pipe 69 is formed with a downwardly facing discharge opening 73. This opens into a discharge nozzle portion 74, at which the water from the cooling jackets W and 67 are combined with the exhaust gases. The manner in which this is done may be best understood by reference to FIGS. 6 and 7. It should be noted that the outer tube 71 is spaced outwardly from the inner tube 69 so as to define a further water jacket 70 that extends around the discharge opening 73.

Figure 6:
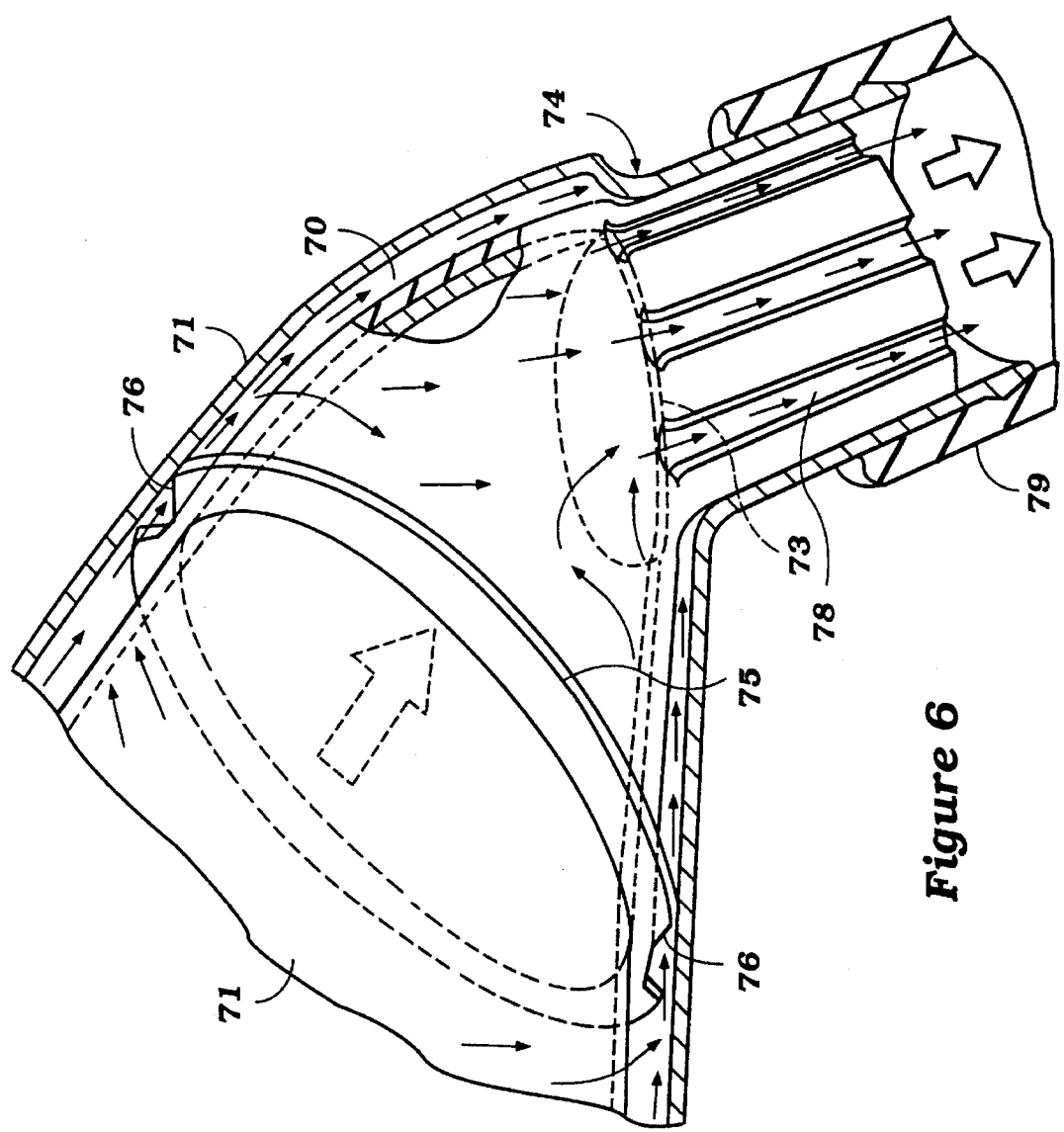
FIG. 6 is a further enlarged cross-sectional view of the rear portion of the exhaust system shown in FIG. 5.
Figure 7:
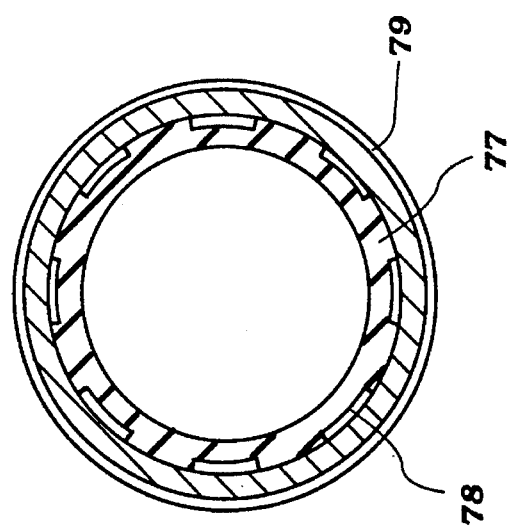
FIG. 7 is a cross-sectional view taken generally along the line 7—7 of FIG. 3.

A baffle plate 75 may be positioned in the discharge end of the outer housing 71 and has openings 76 so that the cooling water will flow in the desired direction to the cooling jacket 70, as shown by the arrows in FIG. 6. The discharge nozzle 74 is formed in part by an elastic sleeve 77 that defines a plurality of flow openings 78 along with an outer sleeve 79 so as to provide the flow channels, as shown in FIG. 6, wherein water from the engine cooling jacket may be mixed with the exhaust gases, as shown by the arrows in this figure.

These exhaust gases then flow through a further exhaust pipe section 79, which has a generally L-shape and which discharges the exhaust gases rearwardly into a water trap device 81 positioned in the hull on one side of the jet propulsion unit 27. This water trap device 81 is suitably baffled so as to ensure that water cannot enter back into the exhaust system from the body of water in which the watercraft is operating. This water trap device then communicates with a trap pipe 82 that extends upwardly from one side of the hull across the top of the tunnel and beneath the rear of the seat 16 to the opposite side of the tunnel. This trap pipe 82 then has a discharge opening 83 that communicates with the tunnel adjacent the jet propulsion unit 27 so as to discharge the exhaust gases into the body of water in which the watercraft is operating along with the water from the cooling jacket of the engine.

As has been previously noted, the amount of exhaust gases from the engine 25 increases as the speed and load of the engine increases. In a similar manner, the amount of coolant circulated by the engine cooling pump also increases as the speed increases. Therefore, in order to maintain a small cooling and exhaust system, it is desirable not to discharge all of the cooling water to the exhaust system. Therefore, there is provided a further water discharge conduit 84 (FIGS. 1-5) that communicates with the cooling jacket 67 of the expansion chamber device through a water inlet opening 85 positioned at the upper extremity of the expansion chamber cooling jacket 67. This cooling conduit 84 siphons off a portion of the water before it can be mixed with the exhaust gases and discharges it back into the body of water in which the watercraft is operating through a discharge end which is disposed in the tunnel area adjacent the discharge end 83 of the exhaust pipe. Because of its high point of communication with the cooling jacket 67 gravity will insure copious flow through the conduit 84.

Furthermore, a still further water discharge conduit 86 of much smaller effective cross-sectional area than the conduit 84 has an inlet opening 87 that communicates with the cooling jacket W of the C-shaped pipe immediately adjacent the exhaust manifold 46. This conduit 86 discharges through the side of the hull immediately adjacent the gunnel 23, as shown in FIG. 4. Hence, the water spray from the discharge 86 will impinge on the gunnel 23 and be dissipated, but still will be visible by the operator of the watercraft. As a result, the operator can ensure that the engine is being adequately cooled by water circulation, but at the same time water can not be collected in the foot areas 18. Also water will drain from the conduit 86 when the engine 25 is not running.

It should be readily apparent from the foregoing description that the described construction provides a very effective exhaust system for a small watercraft that provides good silencing and cooling, and yet will ensure that water cannot enter the engine through the exhaust system. In addition, the system provides for reduced back pressure by discharging a portion of the water directly to the body of water in which the watercraft is operating without mixing with the exhaust gases. Furthermore, the tell-tale construction provides a very good indication of water flow while avoiding the disadvantages of the prior art constructions.

Of course, the foregoing description is that of a preferred embodiment of the invention, and various changes and modifications may be made without departing from the spirit and scope of the invention as defined by the appended claims.

I claim:

1. A watercraft comprised of a hull, a passenger's area formed by said hull in the deck portion thereof and having a raised longitudinally extending seat portion adapted to accommodate at least a rider seated in straddle fashion, an engine compartment formed in said hull, an engine contained within said engine compartment for driving a propulsion unit for powering said watercraft, an exhaust manifold for receiving exhaust gases from said engine and having a forwardly facing outlet, an exhaust pipe extending in an upward direction from said forwardly facing exhaust manifold outlet and then rearwardly and downwardly to an exhaust gas outlet at the rear of said hull for discharging exhaust gases to the atmosphere, at least a portion of said exhaust pipe being disposed beneath said seat portion.

2. The watercraft as set forth in claim 1, wherein the exhaust pipe delivers exhaust gases to a water trap device for precluding water from flowing through said exhaust pipe to the engine.

3. The watercraft as set forth in claim 1, wherein the downwardly extending portion of the exhaust pipe is provided with an enlarged volume for functioning as an expansion chamber for assisting in the silencing of the exhaust gases.

4. The watercraft as set forth in claim 3, wherein the expansion chamber is formed on one side of and above the engine.

5. The watercraft as set forth in claim 4, wherein the exhaust pipe delivers exhaust gases to a water trap device for precluding water from flowing through said exhaust pipe to the engine.

6. The watercraft as set forth in claim 5, wherein the water trap device is disposed on the same side of the hull as the expansion chamber.

7. The watercraft as set forth in claim 1, wherein the engine is water cooled by coolant drawn from the body of water in which the watercraft is operated.

8. The watercraft as set forth in claim 7, wherein at least a portion of the water flowing through the engine for its cooling is discharged into the exhaust pipe.

9. The watercraft as set forth in claim 8, wherein the exhaust pipe delivers exhaust gases to a water trap device for precluding water from flowing through said exhaust pipe to the engine.

10. The watercraft as set forth in claim 8, wherein at least a portion of the engine coolant is discharged through a tell-tale outlet disposed in an area to be visible by an operator seated on the seat portion.

11. The watercraft as set forth in claim 10, wherein the tell-tale outlet is formed on the lower side of the hull so that water flowing from it will not enter the passenger's area and will drain from the tell-tale when the engine is not running.

12. The watercraft as set forth in claim 11, wherein the hull is comprised of a lower portion and a deck portion connected to each other by a gunnel, the tell-tale outlet is shielded by gunnel.

13. The watercraft as set forth in claim 10, further including an additional water outlet for discharging water from the engine cooling system back to the body of water in which the watercraft is operating independently of the exhaust system and the tell-tale outlet.

14. The watercraft as set forth in claim 13, wherein the further water outlet has a larger effective area than the tell-tale outlet and has an inlet at the highest portion of the cooling system.

15. The watercraft as set forth in claim 1, wherein at least a portion of the upwardly extending part of the exhaust pipe that extends rearwardly is disposed above the exhaust manifold.

16. A watercraft comprised of a hull, a passenger's area formed by said hull in the deck portion thereof and having a raised longitudinally extending seat portion adapted to accommodate at least a rider seated in straddle fashion, an engine compartment formed in said hull, an engine contained within said engine compartment for driving a propulsion unit for powering said watercraft, an exhaust manifold for receiving exhaust gases from said engine and having an outlet, an exhaust pipe extending from said exhaust manifold outlet upwardly and then rearwardly and downwardly to an exhaust gas outlet at the rear of said hull for discharging exhaust gases to the atmosphere, at least a portion of said exhaust pipe being disposed beneath said seat portion, said exhaust pipe having a trap section that extends vertically upwardly and transversely across said hull beneath the rear of the seat portion and which terminates at a downwardly positioned exhaust gas outlet.

17. The watercraft as set forth in claim 16, wherein the propulsion unit is contained at least in part in a tunnel disposed beneath the rear of the hull and wherein the exhaust pipe trap section extends across the top of the tunnel.

18. The watercraft as set forth in claim 17, wherein the propulsion device comprises a jet propulsion unit driven by the engine.

19. The watercraft as set forth in claim 17, wherein the exhaust pipe outlet is discharged into the tunnel.

20. The watercraft as set forth in claim 17, further including a water trap device interposed in the exhaust pipe on the side of the tunnel opposite to the exhaust gas outlet.

21. The watercraft as set forth in claim 20, wherein the exhaust pipe outlet is discharged into the tunnel.

22. A watercraft comprised of a hull, a passenger's area formed by said hull in the deck portion thereof and having a raised longitudinally extending seat portion adapted to accommodate at least a rider seated in straddle fashion, an engine compartment formed in said hull, a water-cooled internal combustion engine contained within said engine compartment for driving a propulsion unit for powering said watercraft, an exhaust manifold for receiving exhaust gases from said engine, an exhaust pipe communicating with said exhaust manifold and for discharging exhaust gases to the atmosphere, means for circulating coolant from the body of water in which the watercraft is operating through the engine cooling jacket, a first coolant discharge for discharging a portion of the water circulated through the engine cooling jacket to said exhaust pipe for discharge to the body of water in which the watercraft is operating along with the exhaust gases, a second cooling discharge having an inlet at the highest point in the cooling system for discharging a portion of the water from the engine cooling jacket directly back to the body of water in which the watercraft is operating independently of said exhaust pipe, and a third coolant discharge for discharging a further portion of the water from the engine cooling jacket directly back to the body of water in which the watercraft is operating independently of said first and said second coolant discharges and at a location to provide a tell-tale to the rider indicating that coolant is being circulated through the engine.

23. The watercraft as set forth in claim 22, wherein the third coolant discharge has a lesser effective area than the second coolant discharge.

24. The watercraft as set forth in claim 23, wherein the tell-tale outlet is formed on the lower portion of the hull underside so that water flowing from it will not enter the passenger's area and will drain from the tell-tale when the engine is not running.

25. The watercraft as set forth in claim 24, wherein the hull is comprised of a lower portion and a deck portion connected to each other by a gunnel, said tell-tale outlet being shielded by said gunnel.

26. A watercraft comprised of a hull, a passenger's area formed by said hull in the deck portion thereof and having a raised longitudinally extending seat portion adapted to accommodate at least a rider seated in straddle fashion, an engine compartment formed in said hull, a water cooled engine contained within said engine compartment for driving a propulsion unit for powering said watercraft, an exhaust manifold for receiving exhaust gases from said engine, an exhaust pipe extending from said exhaust manifold to an exhaust gas discharge for discharging exhaust gases to the atmosphere contiguous to the body of water in which the watercraft is operating, means for circulating water from the body of water in which said watercraft is operating through a cooling jacket for said engine, a first coolant discharge for discharging a portion of the water circulated through said engine cooling jacket back to the body of water in which said watercraft is operating through said exhaust pipe, and a second coolant discharge including a tell-tale outlet for discharging a portion of the water circulated through said engine cooling jacket back to the body of water in which said watercraft is operating directly and independently of said first coolant discharge, said tell-tale outlet being positioned in a lower portion of said hull where it will be visible to the rider but where the water will not enter the passenger's area.

27. The watercraft as set forth in claim 26, wherein the hull is comprised of a lower portion and a deck portion connected to each other by a gunnel, said tell-tale outlet being shielded by said gunnel.

* * * * *